Sept. 22, 1959            L. BONO            2,905,119
ZIGZAG CONTROL DEVICE FOR SEWING MACHINES
Filed April 2, 1954            9 Sheets-Sheet 3
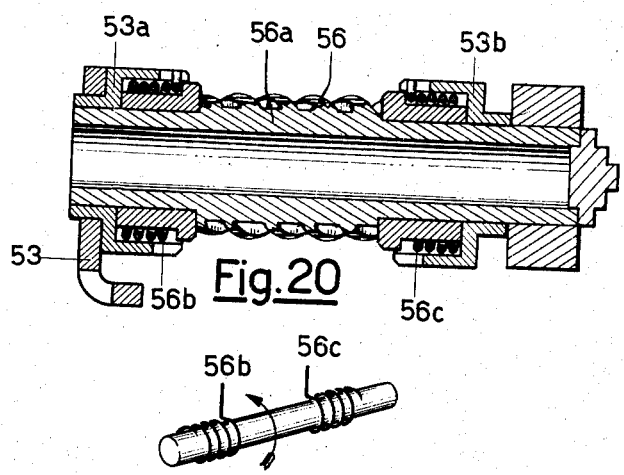
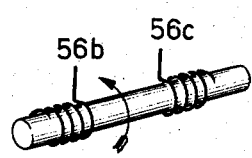
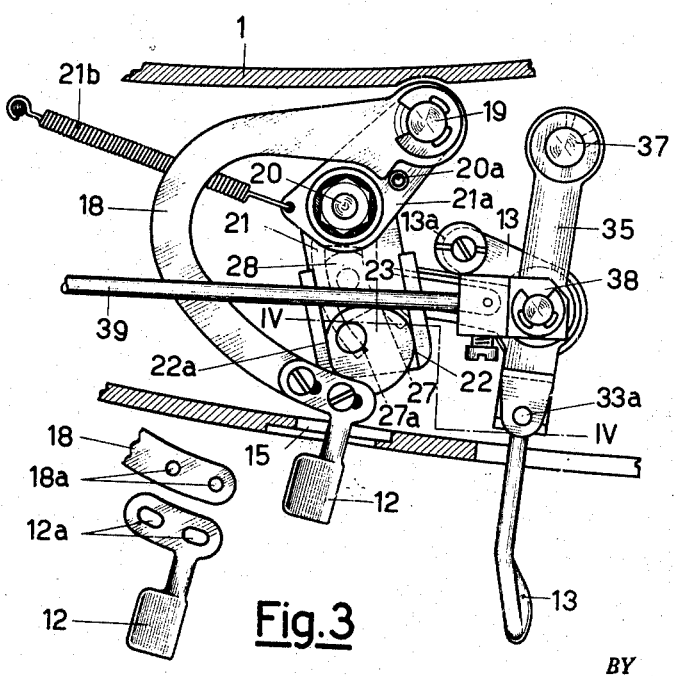
INVENTOR.
LUIGI BONO Sept. 22, 1959        L. BONO        2,905,119

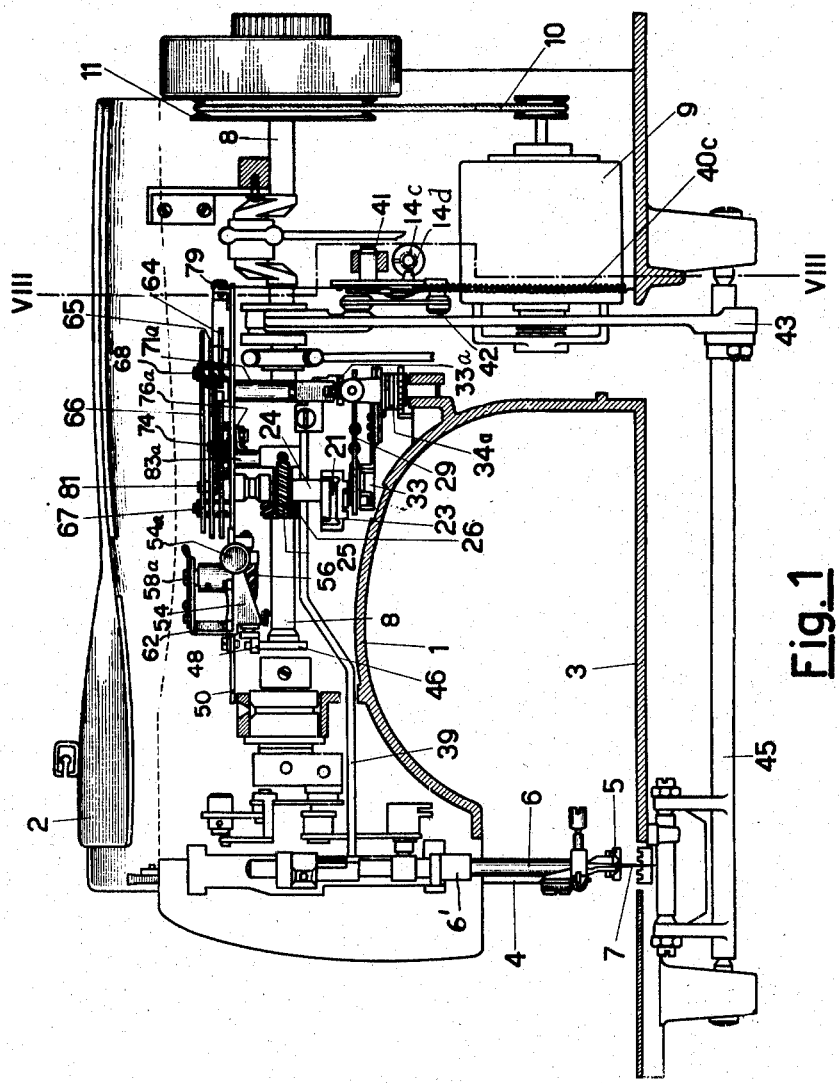

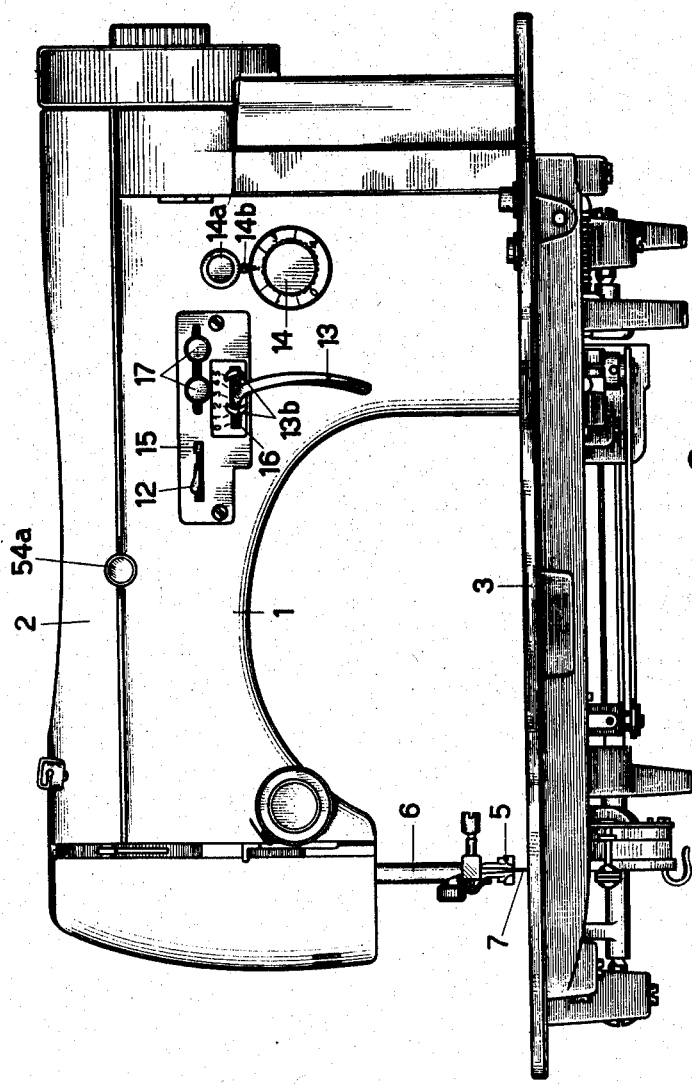

ZIGZAG CONTROL DEVICE FOR SEWING MACHINES

Filed April 2, 1954        9 Sheets-Sheet 4

INVENTOR.
LUIGI BONO

Sept. 22, 1959 L. BONO 2,905,119
ZIGZAG CONTROL DEVICE FOR SEWING MACHINES
Filed April 2, 1954 9 Sheets-Sheet 5

INVENTOR.
LUIGI BONO
BY

Sept. 22, 1959 L. BONO 2,905,119
ZIGZAG CONTROL DEVICE FOR SEWING MACHINES
Filed April 2, 1954 9 Sheets-Sheet 6
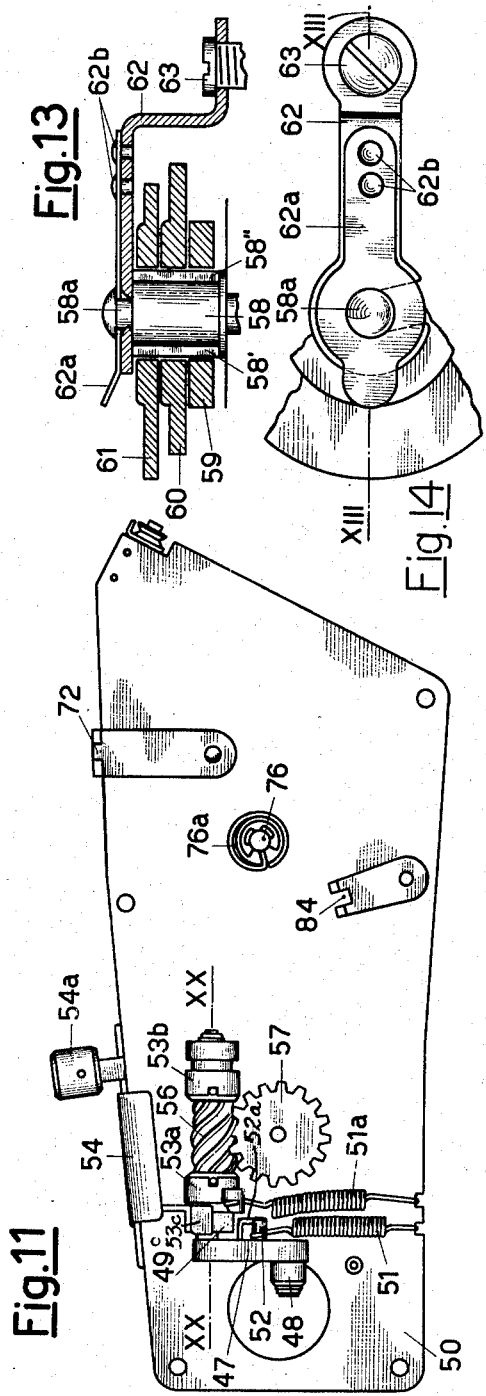
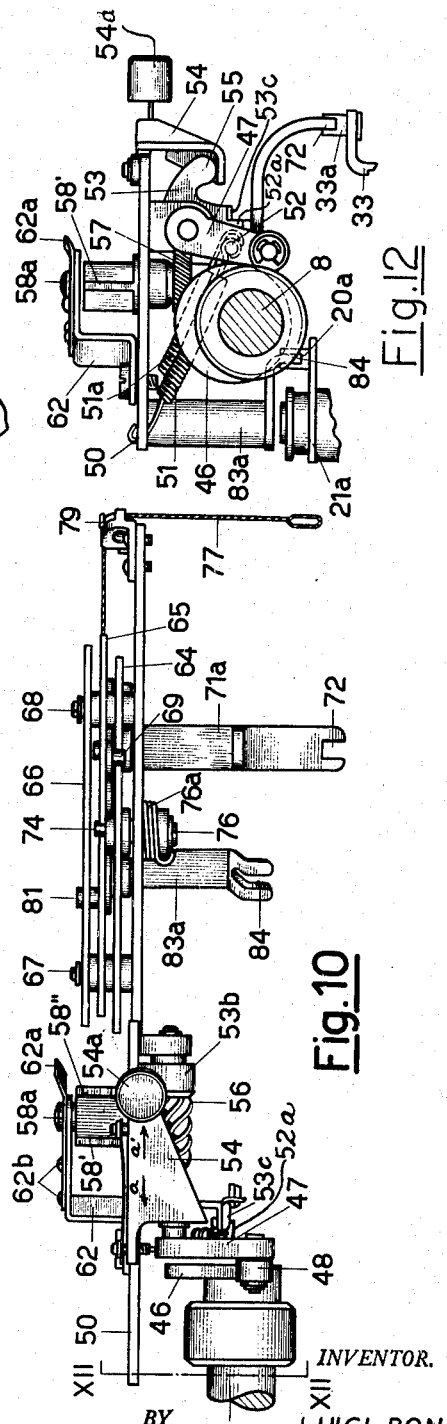
INVENTOR.
LUIGI BONO

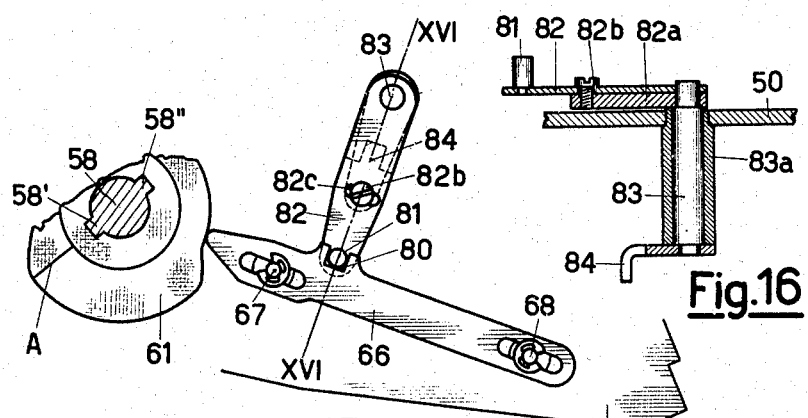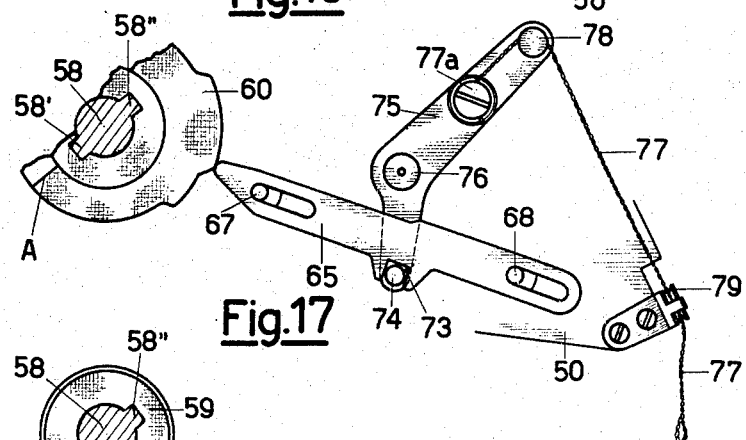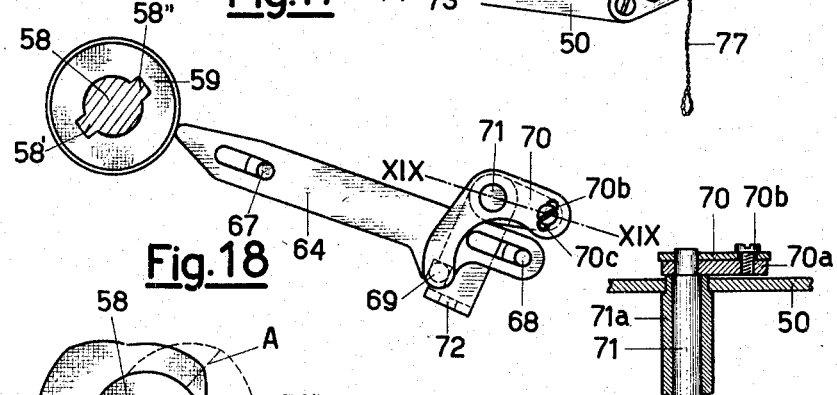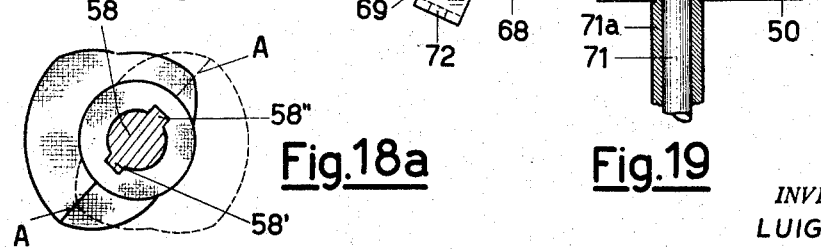

Sept. 22, 1959 L. BONO 2,905,119
ZIGZAG CONTROL DEVICE FOR SEWING MACHINES
Filed April 2, 1954 9 Sheets-Sheet 8
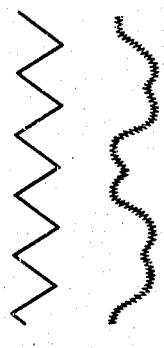
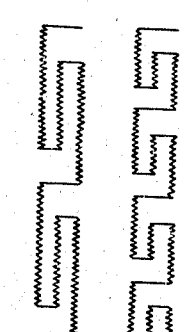
Fig. 23  Fig. 25  Fig. 27  Fig. 29  Fig. 32
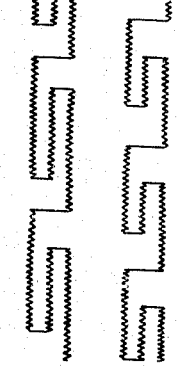
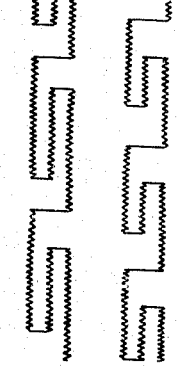
Fig. 22  Fig. 24  Fig. 26  Fig. 28  Fig. 30  Fig. 31
INVENTOR.
LUIGI BONO
BY
Attorneys Sept. 22, 1959  L. BONO  2,905,119
ZIGZAG CONTROL DEVICE FOR SEWING MACHINES
Filed April 2, 1954  9 Sheets-Sheet 9

INVENTOR.
Luigi Bono
BY Wenderoth, Lind
and Ponack
ATTORNEYS

United States Patent Office 2,905,119
Patented Sept. 22, 1959

2,905,119

ZIGZAG CONTROL DEVICE FOR SEWING MACHINES

Luigi Bono, Pavia, Italy, assignor to Vittorio Necchi Società per Azioni, Pavia, Italy Application April 2, 1954, Serial No. 420,668

Claims priority, application Italy April 11, 1953

4 Claims. (Cl. 112—158)

It is an object of the present invention to provide a device for use in sewing machines, provided with a mechanism for zigzag sewing adapted to perform embroidery automatically.

Present zigzag sewing machines are normally provided with a means for varying the position of the seam line, which means comprises a needle-displacing device, by means of which the needle and hence the seam line can be displaced progressively towards the right or towards the left in respect to a middle position until it reaches two positions which are respectively the right limit and the left limit. Moreover they are normally provided with a zigzag amplitude adjusting device, i.e. a device which adjusts the displacement of the needle sideways.

A third device normally used is the stitch length adjuster adapted both for varying the length of the stitch and for reversing the direction of movement of the cloth.

By actuating these three devices rhythmically by hand from the outside of the machine one obtains embroidery work, i.e. seams of non-uniform height. However, it is practically impossible for the operator to displace them contemporaneously and even if this were possible it is impossible to actuate them in such a way as to obtain a perfect design which is periodically repeated.

There has been suggested a cam arrangement for varying these three adjustments according to a predetermined pattern, which pattern can be changed by substituting cams in the cam arrangement.

It is an object of the present invention to provide means whereby the cam controlled operation of the three varying means, the seam line varying means, the zigzag amplitude varying means and the stitch length varying means, can be modified by a hand adjustment means so as to changing the maximum movement imparted to the needle by the three varying means.

The accompanying drawings and the following description illustrate the apparatus according to the invention in its particulars of operation and structure.

Fig. 1 is a side elevation view, in section, of a sewing machine incorporating apparatus according to the invention.

Fig. 2 is a side elevation view of the machine with its three varying devices, for adjusting the seam line, for adjusting the amplitude of zigzag and for adjusting the length of stitch.

Figs. 3, 4, 5, 6 and 7 show the details of the device for hand adjusting the lateral displacement of the needle caused by the cam operation of the varying devices for the seam line and the zigzag amplitude.

Figs. 10, 11, 12, 13 and 14 show the details of the apparatus for driving cams for making the various needle displacements automatic.

Figs. 15, 16, 17, 18 and 19 show the details of the cams and of the rods for controlling the needle displacements.

Figs. 20 and 21 show the details of a unidirectional dragging mechanism.

Figs. 22 to 32 show some types of embroidery obtainable with the device of the in invention.

Figure 4:
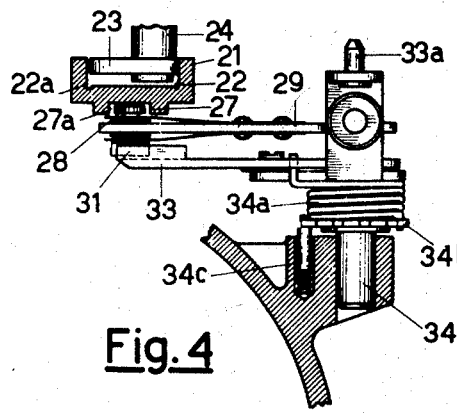

The sewing machine represented by way of example in Figure 1 comprises an arm 1, provided with a cover 2 hinged on the arm, and a base 3. The cloth pressing bar 4 carries at its lower part the foot 5.

The needle bar 6, which has fitted in its lower portion the needle 7, is reciprocatingly displaced in vertical direction in its supporting member 6', in a manner known by means of members driven by the upper shaft 8.

Furthermore, said support 6' is pivoted on a vertical axle so that, by means of suitable driving members, which will be illustrated hereinafter, the needle bar 6 can be displaced laterally in two directions with respect to a central position.

The shaft 8 which drives the supporting member 6' is in turn driven by motor 9 through belt 10 running over pulley 11 on shaft 8.

From the front of arm 1 project levers 12, and 13, knob 14 and push button 14a. Passing to the horizontal part of the arm, one finds the upper shaft 8 moved by the motor 9 by means of the belt 10 running over the pulley 11, or moved by a pedal control not represented in the drawing. In the front part of the arm there project the levers 12 and 13, the knob 14 and the push-button 14a.

The upper lever 12 serves to displace the needle to the right or left in respect to a middle position of the seam line. That is, to the middle position of the lever 12 in the slit 15 there corresponds a centered position of the seam; to the right-hand or left-hand position of the lever 12 there corresponds respectively a right or left hand position of the seam. The lever 13 adjusts the width of the zigzag; hence by displacing said lever from one end to the other of the slit 16, the needle changes from straight sewing to sewing with maximum zigzag.

The knob 14 adjusts and limits the length of the stitch. The push-button 14a serves for the reversal of the cloth feed. On the periphery of the knob 14 there are graduated markings. If the zero mark coincides with the index 14b the length of the stitch is zero. On rotating the knob 14 from this position to another extreme position, one obtains stitch length which reaches a maximum. To every position of the knob 14 there corresponds a predetermined length of stitch with forward direction of feed. On pressing the push-button 14a, one obtains reversal of the feed direction.

The mechanism by which these variations are obtained through the use of these hand levers and knobs will now be described.

The lever 12 for displacing the centerline of the needle action laterally, is fixed to the curved lever 18, which in turn is pivoted on the pin 19 (Fig. 3).

The oscillating lever 21 is pivoted at 20 to the piece 21a on which is a small pin 20a. The lever 21 has on its upper face a groove defined by the shoulders 22 and 22a which groove has therein a cam 23 (Figure 4) mounted on one end of the vertical shaft 24. The other end of shaft 24 has a helical gear 25 thereon (Figure 1) meshed with another gear 26 mounted on the upper shaft 8. The rotation of the upper shaft 8 causes a rotation of the cam 23 and, therefore, an oscillation of the lever 21 about the pin 20.

On displacing the lever 12 to the right by hand, the curved lever 18 fixed thereto and having a projection thereon in contact with the pin 20a moves piece 21a and displaces the fulcrum 20 and, therefore, the lever 21 relative to the vertical shaft 24. The spring 21b having one end fixed to the piece 21a and having the other end connected to the frame 1, ensures the return of the lever 21, which can thus be moved in only one direction by means of the lever 12.

Figure 7:
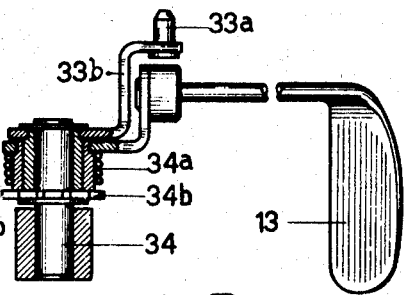
Figure 5:
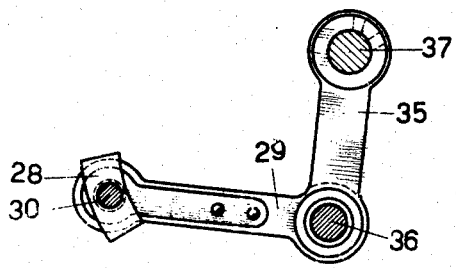
Figure 6:
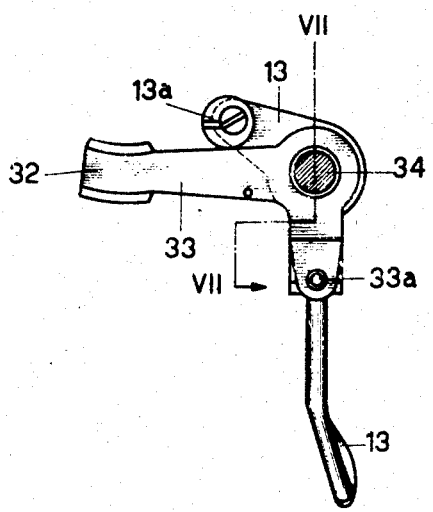

The lower face of the lever 21 is provided with a curved groove defined by the shoulders 27 and 27a. In this groove slides the sector 28 (Figures 4 and 5) pivoted on one end of the small connecting rod 29 by means of the pin 30, which on the lower end has a roller 31. Said roller is engaged in the groove 32 on the zigzag adjusting lever 33 (Figures 6 and 7). Said lever 33 has two horizontal arms at right angles to each other, on one of which arms is a vertical extension 33b with a small pin 33a thereon to which automatic drive means can be connected as will be described hereinafter; and said lever 33 is pivoted on the pin 34. The lever 13 is actuated from the outside; it too has a vertical projection on one arm and on the end of the other arm has an adjustable eccentric 13a. The return of the lever 33 is ensured by the helical spring 34a wound around the pin 34 and engaging lever 33. The tension of the spring is adjusted by the position of the toothed washer 34b positioned by the spring loaded pin 34c. The small connecting rod 29 is pivoted by means of the pin 36, to the arm 35 mounted on the vertical shaft 37. On the pin 36, separate from pin 34, the small block 38 is also mounted (Fig. 3) to which the rod 39 is fixed: said rod 39 is connected to the oscillating support member 6' for the needle bar.

Consequently, when pin 20 is displaced thus displacing lever 21 with respect to the vertical shaft 24, by moving lever 12 or moving the small pin 20a by other means (to be described later), lateral displacement of the connecting rod 29 occurs displacing the small block 28, the rod 39 and thus also the centerline of the seam.

Clearly the amplitude of the zigzag depends on the position of the sector 28 in the lower groove of the oscillating lever 21. If the sector 28 is directly below the pin 20, the displacement of the small connecting rod 29 is zero, in fact the cam 23, rotating on the axis 24, displaces lever 21 around pin 20; consequently, the rod 39 and, therefore, the needle-bar 6 is not displaced laterally relative to the seam line; in this case the seam is straight.

If by means of the lever 13 the position of the sector 28 is displaced from the position directly beneath the pin 20 to the other end of the lever 21, the displacement of the needle bar and thus also the amplitude of the zigzag increases from zero to a maximum value relative to the seam line. The two pins 13b controlled by the two buttons 17 can limit the displacement of the lever 13, and can be used to position the said lever at any point along the slit 16.

For the adjustment of the position of the lever 12 to adjust the position of the needle 7, in lever 12 there are provided two holes 12a having the shape of button-holes which correspond to two circular holes 18a in the curved lever 18. Lever 12 is fastened to lever 18 by means of screws. Lever 12 can be adjusted in such a way that its position along the slot 15 corresponds either to the central seam line position of needle 7 or to a seam line position to the right or to the left of the central seam line position.

The eccentric 13a is locked on the lever 13 by a screw. This is necessary for the adjustment of the positioning of the lever 13 in its slot 16. To the setting for zero amplitude of the zigzag there must correspond a position of the lever 13 in its slot 16. This accurate positioning will be attained by adjusting the relative position between the levers 13 and 33, and this is made possible by securing the eccentric 13a fast to the lever 13 in the proper position against the lever 33.

The lateral displacement of the needle is accompanied by a similar longitudinal oscillation of the shuttle, which is governed by the oscillation of the arm 35 (Fig. 3) and consequently by the oscillation of the vertical shaft 37, which is connected to the shuttle carrier by members (not shown here) placed under the base, and forming the subject matter of Italian Patent No. 363,084 of applicant.

The two devices for varying the zigzag and for varying the position of the seam line can be controlled in two ways: in fact, the piece 21a which through the kinematic chain described hereinbefore moves the rod 39, and hence the needle bar, laterally, can be controlled by acting upon the lever 12 or upon the small pin 20a. So also zigzag adjusting lever 33 can be displaced by acting upon the lever 13 or upon the small pin 33a. Mechanism for acting directly upon these pins will be described hereinafter.

Figure 9:
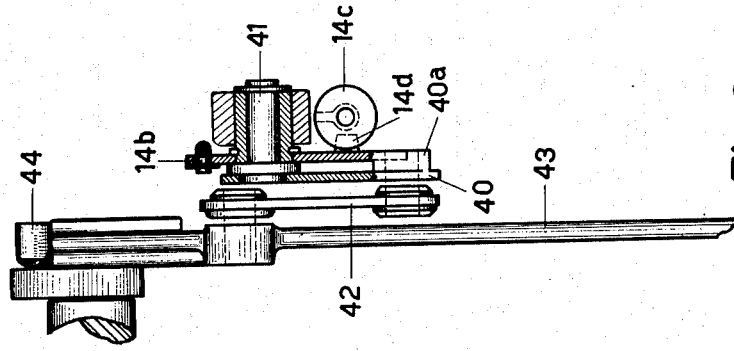
Figs. 8 and 9 show the details of the device for the hand adjusting of the means for varying the length of the stitch.
Figure 8:
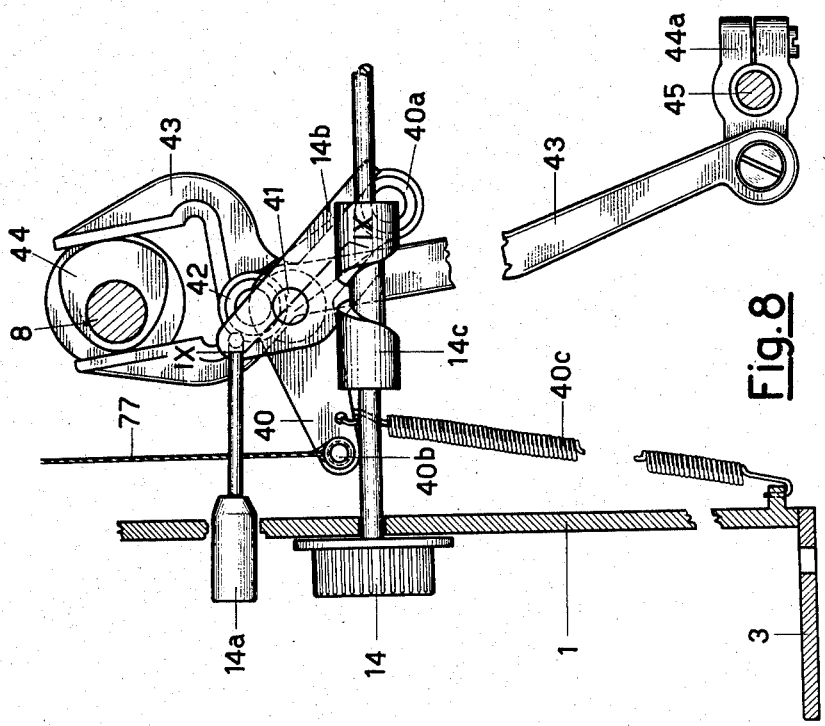
Figure 33:
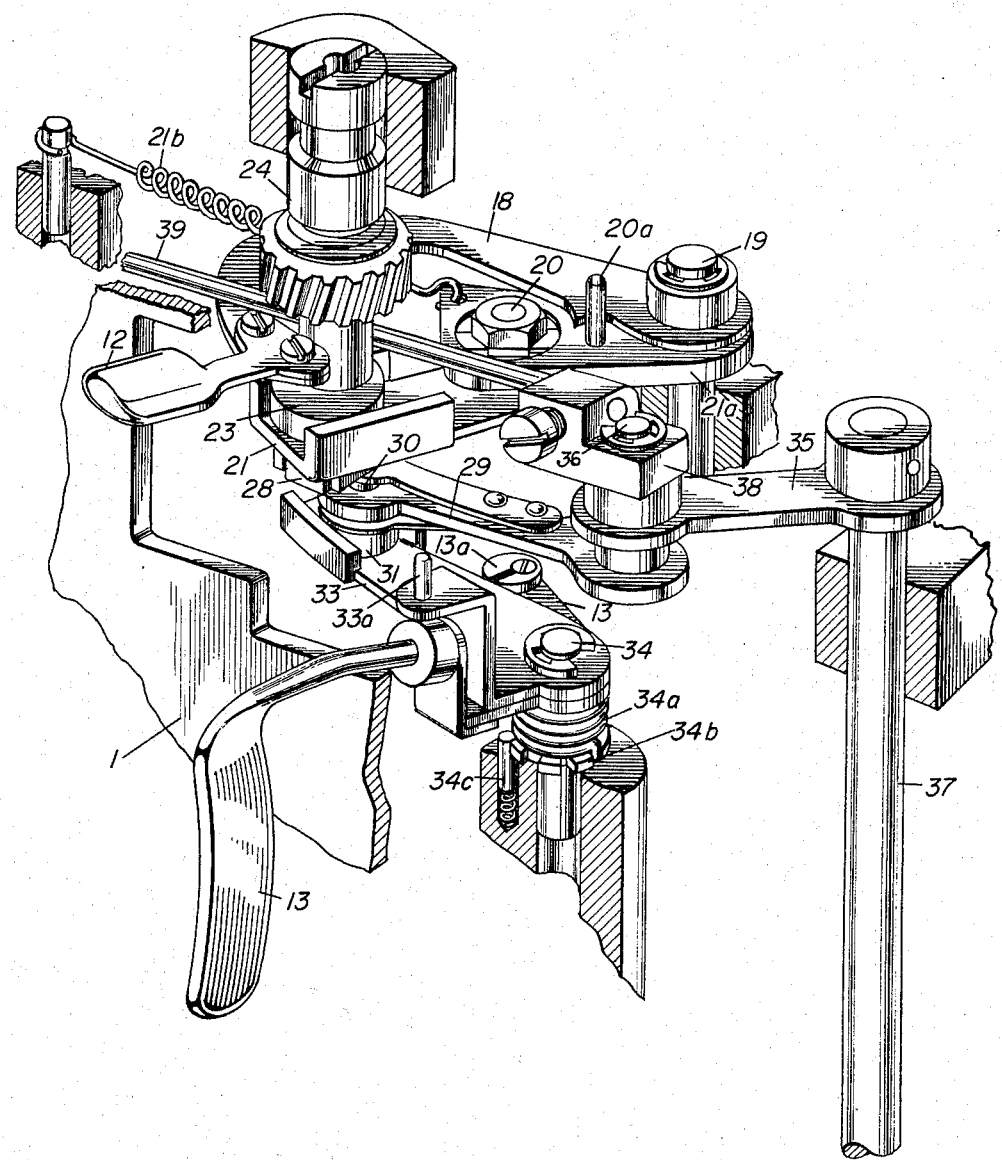
Fig. 33 is a perspective view of the mechanism of Fig. 3.

The push-button 14a controls the small plate 14b (Figures 8 and 9) pivoted at 41 to the framing of the machine. Said plate has a groove at one end around the bushing 40a on the end of one arm of crank 40 which is centrally pivoted at 41. This crank is pivoted to the small connecting rod 42 around the axis of the bushing 40a and at the other end has thereon a small pin 40b. The small connecting rod 42 is pivoted at its other end to the lever 43; the forked head of which is engaged with the eccentric 44 on the upper shaft 8. The other end of the lever 43 is connected by means of the junction 44a to the shaft of the forwarding member 45, which displaces the forwarding or feed member with conventional means not here described.

On the shaft of the knob 14 there is mounted the cam 14c having a groove with a width increasing from a minimum to a maximum and corresponding to an entire revolution about its axis. The internal shoulders of said groove are inclined in such a manner that a cross section of the groove at any point is a trapezoid with its shorter base on the bottom of the groove. The pin 14d is frustoconical in shape and is mounted on the small plate 14b and is slidable in the groove of the cam 14c. The diameter of the smaller base of the pin is equal to the minimum width of the groove.

Hence on rotating the knob 14 in one direction, the pin 14d bears against one side of the groove and this side compels the pin 14d to displace small plate 14b connected thereto to rotate it about the pin 41, taking along the crank 40. On operating said knob in the opposite direction, the crank 40 rotates in the opposite direction due to the force exerted by the helical spring 40c having one end fixed to said crank 40 and the other end connected to the frame in the proximity of the base of the machine.

To every position of the knob 14, with the pin 14d bearing against one side of the groove and held in that position by the tension of the spring 40c, there corresponds a stitch-length and cloth feed.

If it is desired to reverse the movement of the cloth, the push button 14a, which acts upon the plate 14b, is pushed to turn plate 14b in such a manner that the pin 14d bears against the other side of the groove. When the push-button is released, the crank 40 returns to its original position under the action of the spring 40c.

The stitch-adjusting device described can also be controlled in two ways: in fact the crank 40 which acts upon the small connecting rod 42 and, consequently, upon the lever of the stitch-regulator 43, can be actuated from the outside by moving knob 14 or button 14a or by a mechanism to be described hereinafter which acts on pin 40b.

For setting the device the cam 14c must be positioned on shaft by adjusting its position both axially and radially in such a manner that when the lever 43 is in the zero feed position, the pin 14d is engaged in the narrowest section of the groove of the cam. The zero position of the knob 14 is made to coincide accurately with the fixed index adjacent the said knob. To obtain embroidery of a given design, it is necessary to act simultaneously upon the three devices: the means for varying the position of the seam line, the means for varying the amplitude of zigzag, and means for varying the stitch length. Means placed in the upper portion of the arm of the machine, completely inside the same, act on these varying means to produce embroidery designs automatically, i.e. without any skill on the part of the operator.

The cam 46 (Figure 1) mounted on the upper shaft 8, during its rotation bears against the small lever 47 (Figure 11) carrying at one end the small roll 48, which is the member in contact with the cam profile, and oscillates lever 47. The lever 47 is hinged at its other end to the support 49 welded to the lower face of the small horizontal plate 50 connected to the arm of the machine by means of screws. The small roll 48 is always held in contact with the cam by the spring 51 fixed at one end to the pin 52 on the lever 47 and at its other end to the plate 50.

The pin 52, mounted on the small lever 47, having plate 52a on one side thereof in the oscillation thereof strikes the extension 53c on the piece 53 (Figure 20) thus causing it to perform an oscillation the amplitude of which is governed by the position of the regulating means 54. The return of the piece 53 is ensured by the helical return spring 51a having one end fixed to said piece and the other to the plate 50. The regulating means 54 having cam surface can be displaced longitudinally in the direction of the arrows a and a' by acting upon the knob 54a connected thereto. By displacing the regulating means 54 from one end position to the other, the piece 53 having the extension 55 in contact with the cam surface of regulating means 54 is displaced and its rest position with respect to lever 47 is accordingly varied. In this way the amplitude of oscillation of the piece 53 taken along by the lever 47, having a continuous oscillating motion, is varied. Said piece 53, having oscillatory movement adjustable in amplitude, is connected to the endless screw or worm 56 by way of a spring device described hereinafter, for transforming the alternate or reciprocating motion into a discontinuous motion which is only in one direction. Hence said screw or worm rotates through an arc the length of which is a function of the position of the piece 54. The gear 57, meshed with the worm 56, is mounted on one end of the vertical shaft 58 (Figure 14). On the other end above the plate 50 there are mounted the three cams 59, 60 and 61 rotated by the shaft 58 by means of the keys 58'—58". Said shaft has a pin 58a with a small diameter at the top. The small bent lever 62 adapted to rotate about pivot 63 has a notch therein that is engaged around the pin 58a. The laminated spring 62a is secured on one end on the small bent lever 62 by means of the rivets 62b and at the other end it has a hole in alignment with the pin 58a and with a diameter slightly larger than the pin. When the three cams 59, 60 and 61 are mounted upon the shaft 58 and rotate therewith, the spring device described prevents any possible axial movement of said cams. By lifting the stop spring 62a and rotating the piece 62 about its pivot 63, the upper end of shaft 58 is freed and it is thus possible to remove the cams in order to replace them. In contact with the three cams 59, 60 and 61 there are the tips of the three rods 64, 65 and 66, each provided with two longitudinal slits along the longitudinal axis thereof.

67 and 68 are two pins fixed on the upper surface of the plate 50 each extending through the slits on all three rods 64, 65 and 66. The rods, spaced by washers mounted on the two pins 67 and 68 are moved by the corresponding cams in the direction of their axis. The rod 64 moved by the cam 59 has a notch in which is engaged a small pin 69 mounted on the lever 70 (Figures 18 and 19). The small plate 70a is connected to the shaft 71 which ends in a curved arm provided with the notch 72.

The screw 70b connects the lever 70 to the small plate 70a. Hence the rod 64 in its axial displacement moves the lever 70 thus compelling the shaft 71 to rotate in the sleeve-support 71a, welded to the lower face of the plate 50. The notch 72, on a terminal part of the shaft 71, is engaged with the small pin 33a of the zigzag amplitude varying lever 33 (Figure 7). The cam 59 thus serves to vary the amplitude of the zigzag. The buttonhole-like bore 70c within which there is placed the screw 70b connecting the lever 70 to the small plate 70a, permits adjustment of the position of the tip of the rod 64 with respect to the position of the notch 72.

The rod 65 (Figure 17) moved by the cam 60 is provided with the notch 73 in which is engaged the pin 74 mounted on the lever 75. Said lever, therefore, is compelled to rotate about the pin 76 by the movement of the rod 65. The pin 76 passing through the plate 50 has on its lower part a helical spring 76a (Fig. 1) which urges the rod 65 away from the cam-carrying shaft 58. This is useful for the mounting of the cam 60. A flexible connection connects the lever 75 to the stitch length varying lever 40 (Figure 8): in fact an inextensible small cable 77 is connected at one end to the pin 77a, is made to pass about the small rod 78 and about the sheave 79. The other end is connected to the small pin 40b on the lever 40 inside the machine.

The contact of the tip of the rod 65 with the cam 60 is ensured by the spring 40c fixed to the lever 40. Said lever in fact is connected to the rod 65 by means of the inextensible cable 77. Hence the cam 60 controls the tip of the rod 65, always in contact therewith, varying the length of the stitch and the direction of feed. Clearly there has to be an accurate relationship between the position of the tip of the rod 65 and the lever 40, and consequently the length of the cable 77 is adjustable by rotation of the friction pin 77a.

The rod 66 moved by the cam 61 is provided with a notch 80 in which is engaged the pin 81 mounted on the lever 82. The small plate 82a is connected to the shaft 83 which ends in a curved arm provided with the notch 84.

The screw 82b connects the lever 82 to the small plate 82a. Hence the rod 66 in its axial displacement pivots the lever 82 thus compelling the shaft 83 to turn in the sleeve-support 83a welded to the lower face of the plate 50. The notch 84 at the end of the shaft 83, engages the small pin 20a mounted on the piece 21a which is part of the seam line varying assembly (Figure 3). The button-hole-like bore 82c within which is placed the screw 82b for joining the lever 82 to the small plate 82a, permits the adjustment of the position of the tip of the rod 66 with respect to the position of the notch 84.

From the foregoing description it is easily realized that, when cams 59, 60 and 61 rotate, the pins 33a, 20a, and 40b, connected to the slot 72, the thread 77 and the slot 84 respectively, are displaced, depending upon the shape of the contour of said cams, thus effecting, respectively, the variation of the amplitude of the zigzag, the variation of the length of stitch and the variation of the seam line position.

The endless screw worm 56 (Figure 20) is fixedly mounted upon a shaft 56a. On the two ends of said shaft there are mounted the two helical springs 56b and 56c coiled in the direction illustrated in Figure 21. The two ends projecting at top of the spring 56b and 56c are engaged respectively in the two slits provided in the bushings 53a and 53b while the other end of each of the two springs is freely wound up on the shaft 56a and the windings thereof exert a slight pressure upon said shaft. The bushing 53a is welded to the piece 53, thus rotating with it, while the bushing 53b is fixed by means of a key to the lower face of the plate 50. So if the bushing 53a turns in the sense of the arrow of Figure 21 due to rotation of the cam 46, the spring 56b grips the shaft 56a taking it along in rotation together with the endless screw 56 at the end of the shaft 56a at bushing 53b, which is fixed, the spring 56c is unwound, and the shaft 56a rotates freely within said spring.

If the bushing 53a rotates in the opposite direction, the spring 56b is unwound, no longer gripping the shaft 56a, which is at standstill due to the braking action of the spring 56c. The periods during which the endless screw worm 56 does not turn and, consequently, the three cams and all of the devices for shifting the needle, for adjusting the zigzag and for adjusting the stitch length connected thereto are not actuated, correspond to the intervals of time during which the needle finds itself in the cloth.

This synchronization is obtained by positioning the cam 46 upon the upper shaft 8 correctly with respect to the position of the needle bar.

Every cam is provided with a reference mark A. The cams can be positioned on the shaft 58 either with the reference A aligned with the key 58' or with the key 58'' (Fig. 18a). Moreover, every cam can be placed on the shaft 58 with either face turned upwardly or downwardly. That is, every cam can be mounted on the shaft in four different positions.

The number of embroidery patterns obtained with three cams, therefore, is multiplied by suitably combining the position of the cams with respect to one another. On the other hand, although the angle at which the cams are keyed on the shaft may change, the needle does not move laterally when it happens to be in the fabric.

As mentioned hereinbefore, the automatic embroidering device can be mounted on the head of the machine quickly by fixing it to the supporting plate of the device with some screws. Moreover, the device when mounted is all inside the machine and during its operation, the levers 12 and 13, the knob 14 and the push-button 14a projecting from the machine are not moved due to the manner in which they are connected to the varying means for the zigzag amplitude, the seam line positioned and stitch length as described above. If the cams are removed from the automatic device or if said device is removed from the machine, the machine can be operated by normal hand-control of the zigzag. The displacement of the wedged slider 54 which varies the amplitude of the oscillation of the worm 56 and, consequently of the speed and angle of rotation of the three cams 59, 60 and 61, changes the shape of the embroidery. Depending on the shape of the cams, it is lengthened or shortened depending on the position of said wedge-shaped slider. As an example of the above, the three meander-shaped embroidery designs represented in Figures 30, 31 and 32 are obtained by using the same group of cams, displacing the slider 54 to three different positions. It is also possible to use the automatic and hand controls at the same time, due to the novel construction of the connections of the hand control levers to the varying means for the zigzag amplitude, the seam line position and the stitch length. For example, with the levers 12 and 13 displaced to the left in Fig. 3 as far as they will go, the projection on the lever 18 permits the pin 20a and consequently the lever 21a to move to the extreme left hand position under the influence of spring 21b. Likewise the lever 13 will have moved the sector 28 directly under the pivot 20. With the knob 14 set at the maximum stitch length position, the pin 14d will be free to move back and forth in the groove on the cam member 14c. The continuously driven cams 59, 60, 61 will thus control the position of the varying means through the action of shafts 83 and 71 on the pins 20a, 33a, and of cable 77 on pin 40b. However, should the lever 12 be moved to the right in Fig. 3 and secured in position, it would cause the pin 20a to be moved out of the extreme position. This would turn the shaft 83 which in turn move the rod 66 away from the position of the base circle of cam 61. If the machine operates in this position, whenever the cam profile contacts the rod 66, it will rotate shaft 83 and move the pin 20a away from the projection on lever 18, thus causing the position of the seam line to vary. If the profile of the cam 61 does not contact the rod 66, the lever 21a will rest against the pin 20a and the position of the seam line will be fixed at this point. The position of the lever 12 therefore provides a limiting position for the position of the varying means for the seam line position.

The same action will occur for each of the other two controls, the lever 13 and the knob 14, each acting on the rods 64 and 65 respectively to move them away from the position of the base circles of the cams 59 and 60 respectively. If they are moved out of their extreme positions, they likewise form limiting positions for the varying means for the zigzag amplitude and the stitch length.

It will thus be seen that the lever 21a, and the lever 20 on which it acts serve as a control means for controlling the linkage which varies the position of the seam line, while the connecting rod 29 and its connections to the lever 21 serve as the control means for the linkage for varying the amplitude of the zigzag, and the cam member 14c and its connection to the lever 43 serves as the control means for the linkage for varying the stitch length. The cams 59, 60 and 61 and the driving mechanism therefor serve as automatic and continuously driven driving means for the control means, whereas the hand levers and knob act on the control means to vary the position of the control means against the spring loading thereof, the hand levers 12 and 13 and the knob 14 moving the control means away from the extreme positions thereof toward which they are urged by the spring loading.

Obviously, to obtain certain embroidery patterns, it is not necessary to vary the amplitude of the zig-zag, the position of the seam line, or the cloth feed speed, all at the same time, instead of using all the three cams at the same time, two or even a single cam could be used.

I claim:

1. In a sewing machine for sewing zigzag embroidery and having a zigzag amplitude varying means, a seam line position varying means, and a stitch length varying means, the combination of a first control means for controlling the means for varying the amplitude of the zigzag, said first control means being spring loaded toward an extreme position, a second control means for controlling the means for varying the position of the seam line, said second control means being spring loaded to an extreme position, a third control means for controlling the means for varying the stitch length, said third control means being spring loaded to an extreme position, continuously driven means connected to each of said control means for automatically and continuously varying the position of said control means against the spring loading, hand adjusting means connected to at least one of said control means for varying the position of said control means against the spring loading simultaneously with said continuously driven means, and locking means for said hand adjusting means for locking the hand adjusting means in position to limit the movement of said control means against the action of the spring loading in the direction of the extreme position of said control means, whereby the automatic variation of said control means may be adjusted as to magnitude.

2. In a sewing machine for sewing zigzag embroidery and having a zigzag amplitude varying means, a seam line position varying means, and a stitch length varying means, the combination of a first control means for controlling the means for varying the amplitude of the zigzag, said first control means being spring loaded toward an extreme position, a second control means for controlling the means for varying the position of the seam line, said second control means being spring loaded to an extreme position, a third control means for controlling the means for varying the stitch length, said third control means being spring loaded to an extreme position, continuously driven means connected to each of said control means for automatically and continuously varying the position of said control means against the spring loading, hand adjusting means connected to at least two of said control means for varying the position of said control means against the spring loading simultaneously with said continuously driven means, and locking means for said hand adjusting means for locking the hand adjusting means in position to limit the movement of said control means against the action of the spring loading in the direction of the extreme position of said control means, whereby the automatic variation of said control means may be adjusted as to magnitude.

3. In a sewing machine for sewing zigzag embroidery and having a zigzag amplitude varying means, a seam line position varying means, and a stitch length varying means, the combination of a first control means for controlling the means for varying the amplitude of the zigzag, said first control means being spring loaded toward an extreme position, a second control means for controlling the means for varying the position of the seam line, said second control means being spring loaded to an extreme position, a third control means for controlling the means for varying the stitch length, said third control means being spring loaded to an extreme position, continuously driven means connected to each of said control means for automatically and continuously varying the position of said control means against the spring loading, hand adjusting means connected to each of said control means for varying the position of said control means against the spring loading simultaneously with said continuously driven means, and locking means for said hand adjusting means for locking the hand adjusting means in position to limit the movement of said control means against the action of the spring loading in the direction of the extreme position of said control means, whereby the automatic variation of said control means may be adjusted as to magnitude.

4. In a sewing machine for sewing zigzag embroidery and having a zigzag amplitude varying means, a seam line position varying means, and a stitch length varying means, the combination of a control means for controlling at least one of said means for varying the amplitude of the zigzag, said means for varying the position of the seam line, and said means for varying the stitch length, said control means being spring loaded to an extreme position, continuously driven means connected to said control means for automatically and continuously varying the position of said control means against the spring loading, hand adjusting means connected to said at least one control means for varying the position of said control means against the spring loading simultaneously with said continuously driven means, and locking means for said hand adjusting means for locking the hand adjusting means in position to limit the movement of said control means against the action of the spring loading in the direction of the extreme position of said control means, whereby the automatic variation of said control means may be adjusted as to magnitude.

References Cited in the file of this patent

UNITED STATES PATENTS

| | | |
|---|---|---|
| 592,510 | Parkes | Oct. 26, 1897 |
| 1,551,453 | Aronson et al. | Aug. 25, 1925 |
| 1,719,613 | Kohler | July 2, 1929 |
| 2,562,009 | Abos et al. | July 24, 1951 |
| 2,653,557 | Casas-Robert et al. | Sept. 29, 1953 |
| 2,684,649 | Scarpa | July 27, 1954 |
| 2,706,914 | Spence | Apr. 26, 1955 |
| 2,755,754 | Urscheler | July 24, 1956 |